United States Patent
Tafreshi et al.

(10) Patent No.: US 10,307,705 B2
(45) Date of Patent: Jun. 4, 2019

(54) SYSTEMS FOR CLOSED LOOP REGENERATION OF GAS DEHYDRATION UNITS USING LIQUID PETROLEUM GAS

(71) Applicant: Chevron U.S.A. Inc., San Ramon, CA (US)

(72) Inventors: Saham Sam Tafreshi, Humble, TX (US); Piyush Balkrishna Shah, Katy, TX (US); Kamalkumar Ishwar Gursahani, Houston, TX (US); Craig Charles Manion, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/124,263

(22) Filed: Sep. 7, 2018

(65) Prior Publication Data

US 2019/0001255 A1   Jan. 3, 2019

Related U.S. Application Data

(62) Division of application No. 15/451,450, filed on Mar. 7, 2017, now Pat. No. 10,099,168.

(51) Int. Cl.

| | |
|---|---|
| *B01J 20/34* | (2006.01) |
| *B01D 53/04* | (2006.01) |
| *B01D 53/26* | (2006.01) |
| *B01D 5/00* | (2006.01) |
| *B01D 3/14* | (2006.01) |
| *B01D 17/02* | (2006.01) |

(52) U.S. Cl.
CPC ........... *B01D 53/0438* (2013.01); *B01D 3/14* (2013.01); *B01D 3/143* (2013.01); *B01D 5/0057* (2013.01); *B01D 17/02* (2013.01); *B01D 17/0214* (2013.01); *B01D 53/261* (2013.01); *B01J 20/3408* (2013.01); *B01J 20/3475* (2013.01); *B01D 2253/116* (2013.01); *B01D 2256/24* (2013.01); *B01D 2257/80* (2013.01); *B01D 2259/4009* (2013.01)

(58) Field of Classification Search
CPC ......... B01J 20/34; B01J 20/3408; B01D 3/14; B01D 53/0438; B01D 5/0057
USPC .......................................................... 502/34
See application file for complete search history.

(56) References Cited

U.S. PATENT DOCUMENTS

| | | |
|---|---|---|
| 2003/0037567 A1 | 2/2003 | Lu |
| 2007/0214959 A1 | 9/2007 | Le Bec et al. |
| 2010/0263532 A1 | 10/2010 | Thomas et al. |

*Primary Examiner* — Edward M Johnson
(74) *Attorney, Agent, or Firm* — Karen R. DiDomenicis

(57) ABSTRACT

A system is disclosed in which water-saturated desiccant in a dehydration unit, having previously been used to dehydrate natural gas, is regenerated in a closed loop process using liquid petroleum gas (LPG). LPG is pumped from a storage tank, vaporized and superheated. The superheated LPG gas enters the dehydration unit such that the hot gas passes over the desiccant thereby regenerating the desiccant. An overhead stream from the dehydration unit passes to a condenser where the temperature of the hot gas from the dehydration unit is dropped to form a fluid stream containing LPG, water and non-condensable gases. The fluid stream passes to a three phase separator for separating the fluid stream into a gas stream, a water stream, and a liquid stream containing LPG which is then returned to the storage tank for reuse in the closed loop process.

5 Claims, 4 Drawing Sheets

SYSTEMS FOR CLOSED LOOP REGENERATION OF GAS DEHYDRATION UNITS USING LIQUID PETROLEUM GAS

CROSS REFERENCE TO RELATED APPLICATION(S)

This application is a divisional of and claims benefit under 35 USC 119 of U.S. application Ser. No. 15/451,450 with a filing date of Mar. 7, 2017. This application claims priority to and benefits from the foregoing, the disclosures of which are incorporated herein by reference.

FIELD

The present disclosure relates to the field of natural gas dehydration units that utilize adsorption beds containing solid desiccant, which includes molecular sieve, alumina, and silica gel, and further relates to systems and methods for regenerating the adsorption beds in such natural gas dehydration units.

BACKGROUND

In conventional natural gas conditioning, natural gas, having passed through an acid gas removal unit (AGRU) and dewpoint control, is often dehydrated by passing the natural gas through a system of vessels or units referred to as a dehydration unit containing adsorption beds made up of particulate material, also referred to interchangeably herein as solid desiccant, molecular sieve or mole sieve. Such a system includes at least two vessels in which one of the vessels contains saturated mole sieve that is in regeneration mode, while the other one or more vessels are operated in dehydration mode. During dehydration mode, water and other contaminants are adsorbed onto the mole sieve material; and during regeneration mode, they are desorbed from the mole sieve. Typically, the regeneration begins by passing hot dry natural gas, i.e., natural gas having been dehydrated, over the saturated mole sieve. This requires a large compressor to return hot dry natural gas to a location upstream of the dehydration unit or the AGRU.

Dehydration of natural gas is typically accomplished by flow of hot gas over zeolite-based molecular sieve adsorbent. Water in the gas is preferentially adsorbed by the molecular sieve. Removal of water from the gas using molecular sieve dehydration is a vital process component in any liquefied natural gas (LNG) plant to meet moisture content specifications (down to 0.1 ppmv). Natural gas can contain additional contaminants such as hydrogen sulfide, mercaptans, oxygen, carbon dioxide, carbonyl sulfide, etc. that are partially co-adsorbed by the molecular sieve. During high pressure regeneration, system design problems such as hydrocarbon and water refluxing can result in poor water desorption (high residual water content within the mole sieve) and corrosion. This can result in early moisture breakthrough and economic losses associated with frequent mole sieve change-outs and low dehydrator availability.

If the mole sieve bed is regenerated at high temperature and low pressure, then the regeneration gas may be a slip stream of dry gas, LNG boil off gas, or any other suitable dry gases. If the regeneration is conducted at high pressure and large vessel diameters, then the vessel thickness and choice of materials will create additional heat load on the regeneration system.

The regeneration gas contains contaminants such as oxygen that reacts with hydrogen, hydrogen sulfide and/or hydrocarbon (e.g. propane) at high regeneration temperatures resulting in the formation of unwanted by-products such as sulfur, sulfur di-oxides, water and carbon dioxide. These by-products can build up in downstream units, or in the fuel system causing problems such as fouling, and off-specification products. Furthermore, the complete regeneration of molecular sieves is not achieved because of the contaminants present resulting in sub-optimal performance of the dehydration unit. This may also be accompanied by damage caused to the molecular sieve resulting in reduced operating life. One known solution is further purification of the regeneration gas by using additional adsorbents. However, such schemes are expensive and will not always result in full contaminant removal of the regeneration gas.

There exists a need for a more efficient, more reliable and less costly method and system for regenerating saturated mole sieve in a natural gas dehydration unit.

SUMMARY

In one aspect, a system is provided for regenerating water saturated mole sieve in a gas dehydration unit containing the water saturated mole sieve used in a process for dehydrating a natural gas feed stream. The system includes a storage tank for storing liquid propane and/or butane (also referred to as LPG); a pump for pumping the LPG from the storage tank; at least two heat exchangers in series for receiving and converting the LPG to a hot (superheated) propane and/or butane gas; a regeneration gas inlet in the gas dehydration unit containing the water saturated mole sieve to be regenerated for receiving the hot propane and/or butane gas such that the hot propane and/or butane gas passes across the water saturated mole sieve thereby regenerating the water saturated mole sieve; a condenser in communication with a regeneration gas outlet in the gas dehydration unit for receiving an overhead stream containing the hot propane and/or butane gas from the gas dehydration unit and dropping the temperature to form a fluid stream containing LPG, water and non-condensable gases; a three phase separator in communication with the condenser for separating the fluid stream into a gas stream, a water stream, and a liquid stream comprising LPG; and a line in communication with the three phase separator for returning the LPG to the storage tank.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
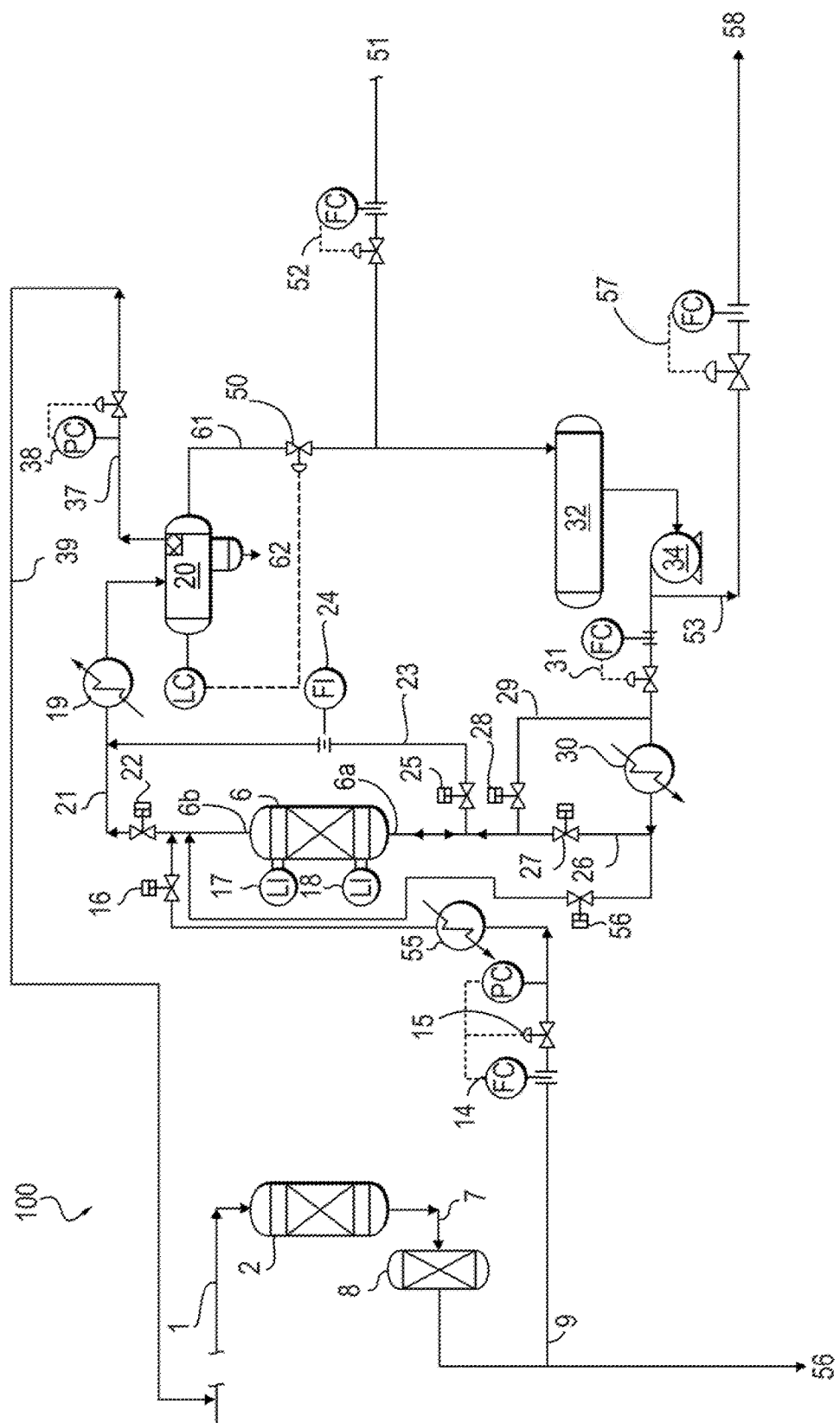
FIGS. 1-4 are schematic diagrams illustrating systems for regenerating a vessel of a dehydration unit according to exemplary embodiments.

In one embodiment, referring to FIG. 1, a system 100 and its operation for regenerating water saturated mole sieve in a gas dehydration unit used in a process for dehydrating a natural gas feed stream will now be described. As shown, the system 100 includes a line 1 for feeding natural gas from a natural gas source (not shown) to the gas dehydration unit which consists of at least two adsorbent beds including vessel 2 and vessel 6. Vessel 2 is shown in dehydration mode, such that moisture-containing natural gas enters at the top of the vessel and dehydrated natural gas exits at the bottom of the vessel. Dehydrated gas is collected in line 7 and can be filtered in filter 8. Filtered dehydrated natural gas can be sent for further gas processing through line 56.

Vessel 6 is shown in regeneration mode. Vessel 6 contains water-saturated desiccant. Vessel 6 has a regeneration gas inlet 6a at the bottom thereof, and a regeneration gas outlet 6b at the top thereof. In an embodiment not shown, the top and bottom could be reversed such that the regeneration gas inlet 6a is at the top of vessel 6, and the regeneration gas outlet 6b is at the bottom thereof.

As is well-known, the direction of flow through the gas dehydration unit vessels 2 and 6 will depend on the mode in the cycle being carried out at any given time. For example, during absorption mode, also referred to as dehydration mode, the flow can be directed from top to bottom. During depressurization mode, flow would then also be directed from top to bottom. Likewise during preheating mode, flow would be directed from top to bottom. During heating mode, also referred to as regeneration mode, the flow would be directed from bottom to top. During cooling mode, flow would also be directed from bottom to top. During drainage mode, flow would be directed from top to bottom. Finally, during pressurization mode, in preparation for absorption mode, flow would be directed from top to bottom. In another embodiment, each of these directions could be reversed.

Optionally, a heater 55 can be added upstream of a switching valve 16 to preheat the vessel 6 (in regeneration mode) until the bed outlet temperature is 5° C. above the dew point temperature of the LPG. Another option is to use superheated LPG in down flow direction using valve 56, in place of using hot natural gas line 9 and heater 55 to preheat the vessel 6 (in regeneration mode) and the bed. Once the bed temperature has reached a desired value the regeneration of the bed will switch to up flow direction.

Optionally, additional vessels (not shown) may be present as one of ordinary skill in the art would understand, both in adsorption and regeneration mode.

A storage tank 32 contains liquid propane and/or butane, also referred to interchangeably herein as liquid petroleum gas or LPG. LPG from the storage tank 32 is pumped by pump 34 from the tank 32 through a line to a heater 30. In one embodiment, the heater 30 can be two heat exchangers in series. A flow controller 31 can optionally be included between the pump 34 and the heater 30. The heater 30 receives and converts the LPG to a hot propane gas and/or butane gas. By "hot propane gas and/or butane gas" is meant that the propane and/or butane gas is superheated, i.e., significantly above its dew point temperature. The hot propane gas and/or butane gas passes through line 26 to the regeneration gas inlet 6a and into the vessel 6 where the hot gas passes across the water saturated desiccant and thereby regenerates the saturated desiccant.

Upon leaving the regeneration gas outlet 6b of the vessel 6, an overhead stream including the propane and/or butane gas having moisture therein passes through the line 21 to condenser 19. In the condenser 19, the temperature of the overhead stream is dropped to form a fluid stream containing LPG and water.

The fluid stream leaves the condenser 19 and enters a three phase separator 20 for separating the fluid stream into a gas stream, a water stream, and a liquid stream including LPG. The gas stream exits the separator 20 through line 37. A pressure controller 38 is used to drop the stream pressure where it is recycled back as a low pressure feed gas stream.

The water stream exits the separator 20 through line 62. The liquid stream including LPG leaves the separator 20 through line 61. In one embodiment, line 61 returns the LPG to the storage tank 32. In one embodiment, the gas stream in line 37 returns to the feed stream in line 1 through line 39.

In case of potential loss of LPG from the system, a flow controller opens up a control valve 52 in line 51 to provide make-up LPG. The source of the make-up LPG (not shown) can be, for example, a depropanizer overhead stream or a debutanizer overhead stream. Control valve 50 in line 61 is controlled by a level controller on the separator 20.

If excess LPG is produced, the line 53 will direct the additional LPG to a de-propanizer or de-butanizer system (not shown) using flow control valve 57 and line 58.

Immediately following the regeneration of the saturated desiccant, the vessel 6 is very hot and should be cooled prior to further use. In one embodiment, to cool the vessel 6, the switching valve 27 is closed and switching valve 28 is opened, the cool LPG from the storage tank 32 can be introduced using line 29 into the lower opening 6a in the vessel 6 such that the LPG vaporizes in the vessel 6. During the initial cooling cycle, some of the liquid LPG will be converted to vapor which will exit the regeneration bed 6 from the regeneration gas outlet 6b. The vaporized propane and/or butane will pass through the line 21 to condenser 19 as previously described. The regeneration bed 6 is filled with LPG until the level transmitter 17 indicates when the vessel 6 is filled thus confirming that the regeneration vessel 6 is cooled.

Draining of the regeneration vessel 6 filled with LPG requires the switching valve 22 and 28 to be closed. The switching valve 25 is opened thus draining the LPG from the regeneration vessel 6 from 6a using line 23 to deliver the LPG liquid to the condenser 19. The level indicator 18 indicates when the vessel 6 is emptied of LPG. The level indicator 17 indicates when the LPG level within the vessel 6 is considered full.

The regeneration vessel 6 is pressurized using by-pass inlet gas from the line 9; the control valve 15 is opened to pressurize the regeneration vessel 6. The switching valves 16 and 25 are opened and the switching valve 22 is closed. When the regeneration vessel is equalized in pressure using control valve 15 and when flow indicator 24 indicates no liquid flow, the valves 25 and 16 are closed. A flow controller 14 can optionally be included. The regeneration vessel 6 is then ready for use in adsorption mode to remove water from the gas stream.

Figure 2:
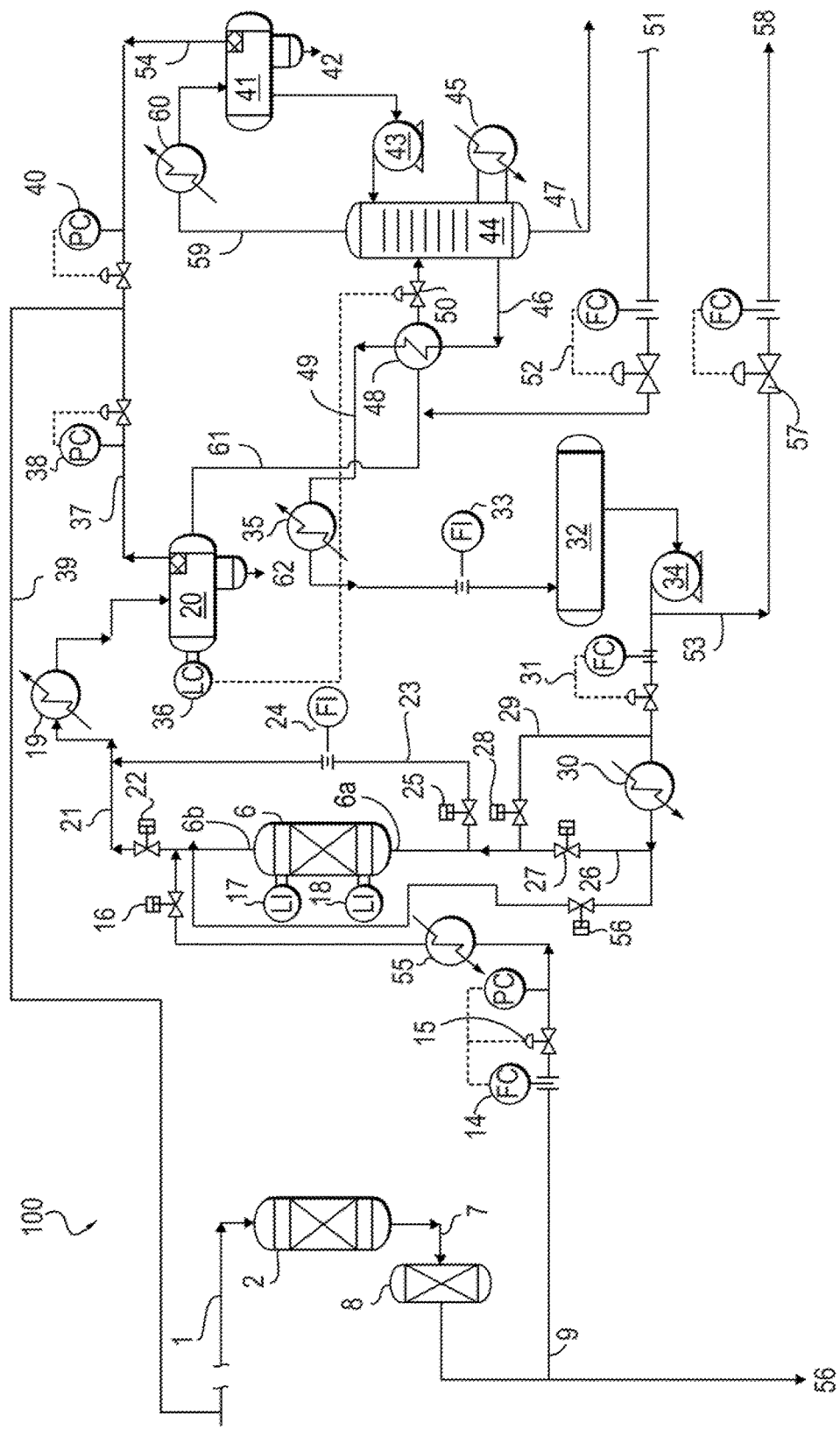

In one embodiment, referring to FIG. 2, an optional distillation column 44 is located between the three phase separator 20 and the storage tank 32. In this embodiment, line 61 transports the LPG to the distillation column 44. A reboiler 45 can be used in conjunction with the distillation column 44. Vapor is removed through an overhead line 59, and cooled in condenser 60. Liquid from the condenser 60 can be separated in separator 41 into a light hydrocarbon gas stream (directed to line 54) and a water stream 42. A pressure controller 40 can be included in line 54. Liquid hydrocarbons can be pumped to the distillation column 44 by pump 43. A heavies stream 47 is removed from the bottom of the distillation column 44. A stream 46 containing propane and/or butane are cooled in a cross heat exchanger 48 and a liquid stream passes through line 49 to a cooler 35. Liquid propane and/or butane are then returned to the LPG storage tank 32. Due to potential loss of LPG from the system, the flow indicator 33 opens up control valve 52 using line 51 to make-up LPG. Control valve 50 in line 61 is controlled by a level controller on the separator 20.

If excess LPG is produced, the line 53 will direct the additional LPG to a de-propanizer or de-butanizer system (not shown) using flow control valve 57 and line 58.

Figure 3:
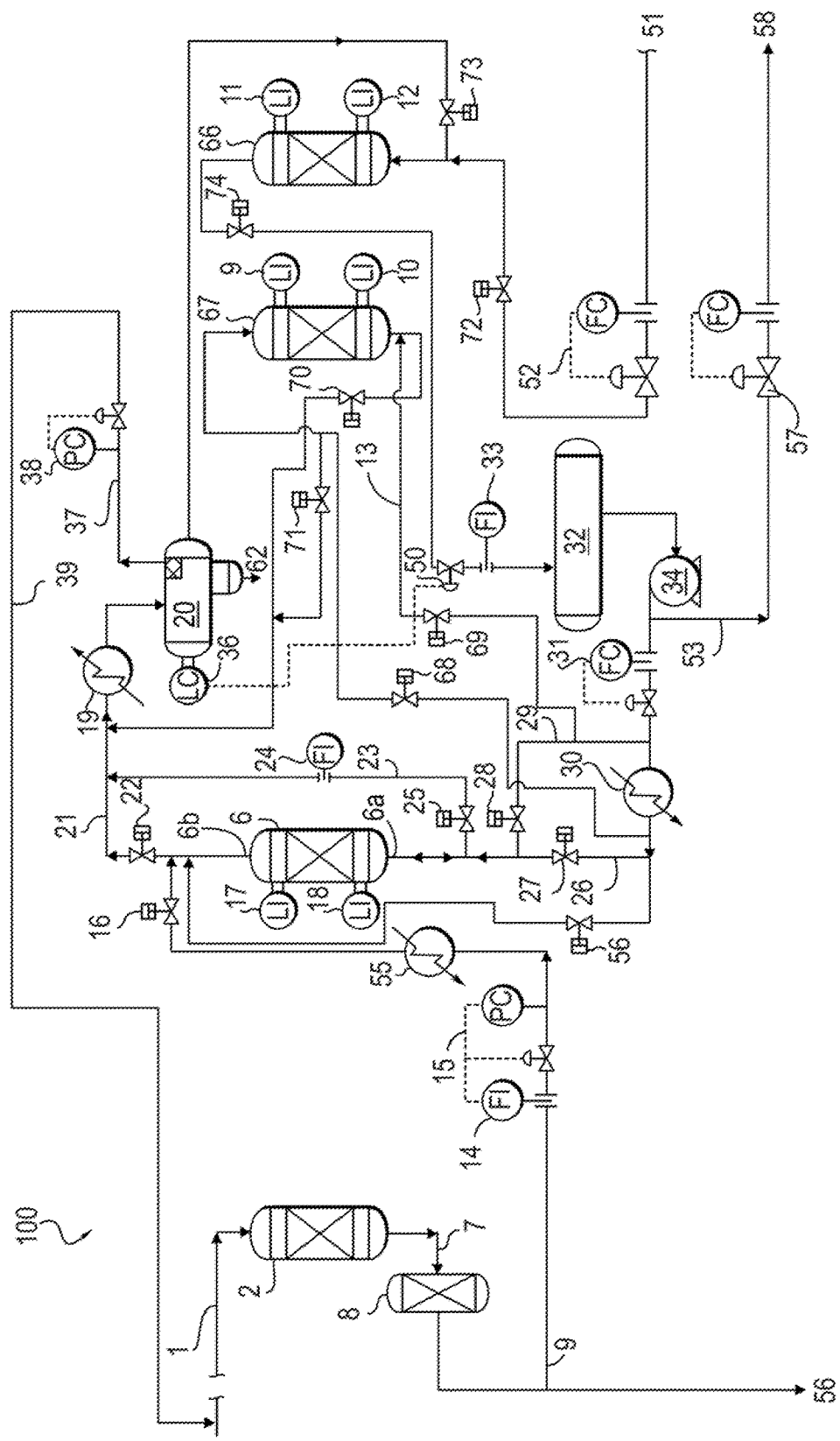

In one embodiment, referring to FIG. 3, an optional dehydration unit, also referred to as 66/67, is located between the three phase separator 20 and the LPG storage tank 32. The optional dehydration unit consists of a plurality of adsorbent bed containing vessels 66 and 67. The optional dehydration unit further removes dissolved water from the hot propane and/or butane gas. FIG. 3 shows vessel 66 in dehydration mode and vessel 67 in regeneration mode. As pictured, a line including valve 70 directs hot propane and/or butane gas from line 26 to dehydration unit 67 and a line directs gas from dehydration unit 67 to a location just upstream of condenser 19. Line 13 is used to cool the bed 67 by vaporizing liquid LPG in up flow direction after the heating cycle. Line 51 can be used to deliver makeup LPG from, e.g., a du-butanizer (not shown) to vessel 66. LPG from vessel 66 is sent to storage tank 32. Switching valves 68 and 69 are used to direct flow of the propane and/or butane to the vessel 66/67. Valve 71 can be provided to divert a side stream of the propane and/or butane to a location in line 21 just upstream of condenser 19. Valve 72 can be provided downstream of control valve 52 and upstream of the vessel 66. Valve 73 can be provided downstream of valve 72 for controlling a flow of liquid stream including LPG from the separator 20 to the vessel 66. Valve 74 can be provided between the vessel 66 and storage tank 32. In another embodiment, each of these directions could be reversed.

Figure 4:
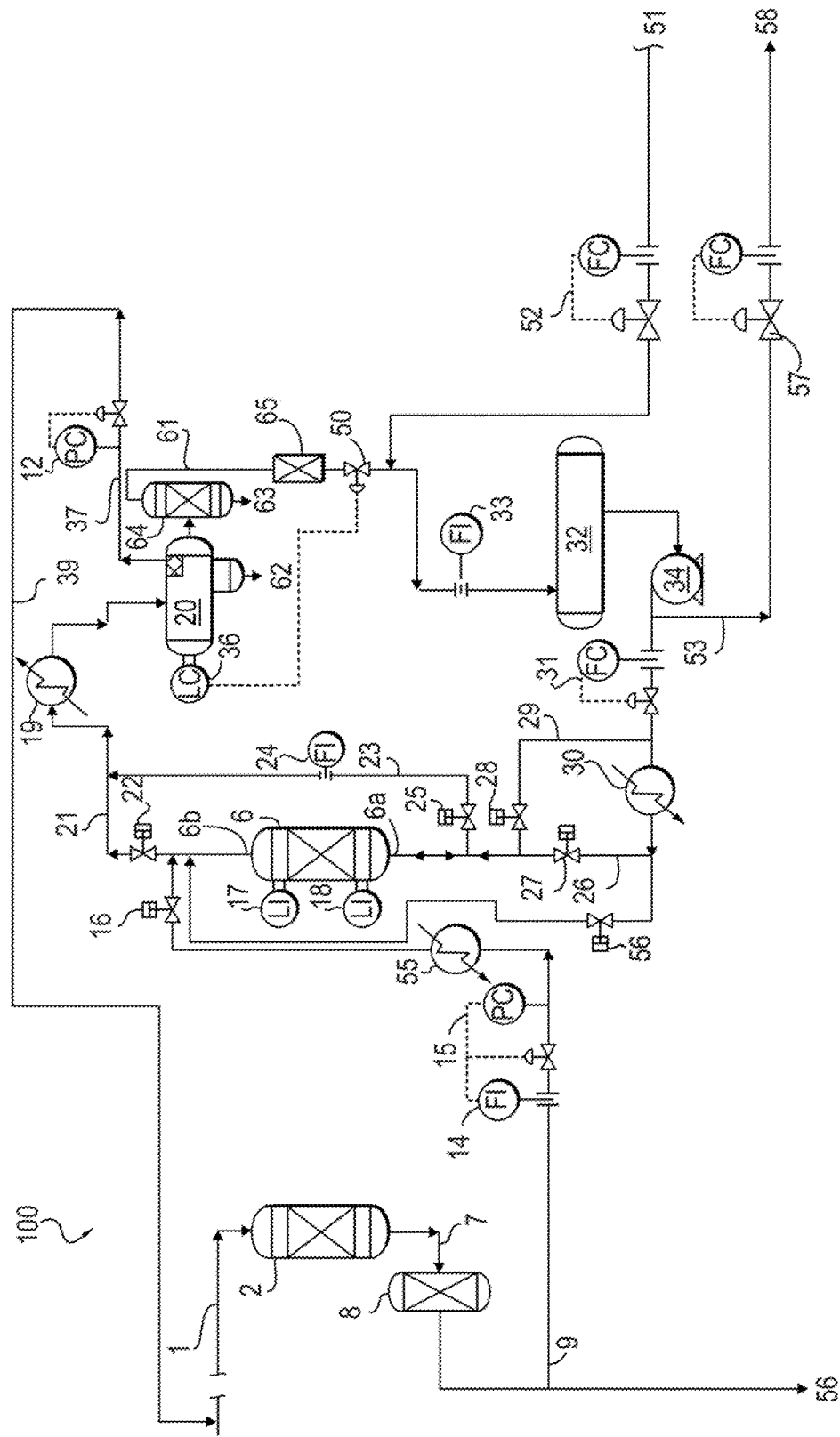

In one embodiment, referring to FIG. 4, an optional solid potassium hydroxide treatment unit 64 is located between the three phase separator 20 and the storage tank 32. The solid potassium hydroxide treatment unit 64 receives the liquid stream containing LPG from the three phase separator 20 and removes hydrogen sulfide, carbonyl sulfide and/or mercaptans from the liquid stream. A waste potassium hydroxide stream 63 can be removed from the solid potassium hydroxide treatment unit 64 and sent to waste storage (not shown) for proper disposal. A stream 61 from the solid potassium hydroxide treatment unit 64 can be treated in optional coalescer 65 to remove treater waste carryovers including, e.g., potassium hydroxide, potassium sulfide, and potassium mercaptide.

If excess LPG is produced, the line 53 will direct the additional LPG to a de-propanizer or de-butanizer system (not shown) using flow control valve 57 and line 58.

Disclosed herein are various embodiments of closed loop regeneration systems and methods. The embodiments disclosed herein are intended to be used in new gas plants or in retrofits of existing gas plants, particularly those having an inadequate regeneration system in which regeneration gas flow rate and contamination issues are concerns. The embodiments disclosed herein offer advantages for the heating step of the regeneration process and utilize existing regeneration facilities for the polishing and cooldown steps.

The closed loop regeneration systems and methods disclosed herein reduce the water refluxing, inadequate regeneration gas flowrate and contaminant problems of conventional systems by using a separate regeneration medium, such as LPG. The regeneration medium can be vaporized (superheated) for regeneration and then condensed, treated to remove compounds such as water and hydrogen sulfide that are desorbed from the molecular sieve bed, and then recycled. The treatment process consists of a combination of a solid bed KOH treater and associated coalescer, stripping column, and a small liquid molecular sieve dehydrator as a moisture guard bed. Based on the available LPG (propane, butane or a mixture of both) and facility infrastructure, one or more of these treating steps can be eliminated. The regeneration medium does not mix with the process gas keeping the adsorption and regeneration systems independent. This can result in better regeneration of the molecular sieves, complete removal of contaminants in the gas stream, and better adsorption efficiency.

Advantages of the present closed loop regeneration systems and methods over conventional systems include but are not limited to the following. Regeneration at low pressure gives higher volumetric gas flow and results in better heat transfer and gas distribution through the molecular sieve bed, thus reducing residual water content. Water refluxing in the molecular sieve bed during regeneration is reduced. Slow ramping using LPG vapor is easier to implement since the superheater hot oil flow rate can be more easily controlled than fired heaters. Cool down of the molecular sieve bed by vaporization of LPG is faster. No compressor is needed to flow the regeneration medium since a pump can be used as the primary power driver to ensure regeneration can be performed at all times. No full flow recycle stream passes back to a location upstream of the dehydration unit or the AGRU which results in smaller equipment sizes for the amine contactor, dehydrator and associated equipment. Sulfur and oxygen free regeneration can be achieved which results in better dehydrator performance and increased longevity. Due to a cleaner regeneration medium, the closed loop regeneration process is more reliable and meets a more stringent 0.1 ppm maximum water content specification in the dehydrator product gas. The regeneration stripping column operating parameters can be adjusted for changing contamination (water, light and heavy hydrocarbons, undesirable sulfur species, non-condensable) in order to provide the best regeneration medium resulting in a lower overall cost. The closed loop regeneration systems and methods eliminate the release of hydrogen sulfide gas during the molecular sieve bed change-out which reduces the overall cycle and change-out times because it does not require flooding of the bed with water and subsequent connection to the flare system to vent the hydrogen sulfide gas. The closed loop regeneration process is safer than the current technologies as it does not expose plant personnel to hydrogen sulfide, has no water usage, and less waste products are generated (other than waste KOH, if a KOH treater is used). Less exposure of cycling isolation valves to hydrogen sulfide occurs during regeneration in sour gas service. The closed loop regeneration systems and methods using LPG shorten regeneration heating time and increases standby time since LPG has a higher heat content (10-20% higher) as a carrier gas in comparison to natural gas. LPG regeneration reduces the occurrence of channeling within the dehydration bed since LPG gas allows for better fluid flow distribution within the dehydration bed due to lower regeneration pressure. In the closed loop regeneration systems and methods using LPG, LPG flowrate can be increased without affecting plant feed capacity since regeneration is performed in a closed loop system. This helps lower regeneration time.

It should be noted that only the components relevant to the disclosure are shown in the figures, and that many other components normally part of a gas dehydration system are not shown for simplicity.

For the purposes of this specification and appended claims, unless otherwise indicated, all numbers expressing quantities, percentages or proportions, and other numerical values used in the specification and claims are to be understood as being modified in all instances by the term "about."

Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A system for regenerating a gas dehydration unit containing saturated mole sieve used in a process for dehydrating a natural gas feed stream, comprising:
   a. a storage tank for storing liquid propane and/or butane;
   b. a pump for pumping the liquid propane and/or butane from the storage tank;
   c. at least two heat exchangers in series for receiving the liquid propane and/or butane and converting the liquid propane and/or butane to a hot propane gas and/or butane gas;
   d. a regeneration gas inlet in the gas dehydration unit containing the saturated mole sieve to be regenerated for receiving the hot propane and/or butane gas such that the hot propane gas and/or butane gas passes across the saturated mole sieve thereby regenerating the mole sieve;
   e. a condenser in communication with a regeneration gas outlet in the gas dehydration unit for receiving an overhead stream containing the hot propane gas and/or butane gas from the gas dehydration unit and dropping the temperature to form a fluid stream containing liquid propane and/or butane, and containing water and non-condensable gas;
   f. a three phase separator in communication with the condenser for separating the fluid stream into a gas stream, a water stream, and a liquid stream comprising liquid propane and/or butane; and
   g. a line in communication with the three phase separator for returning the liquid propane and/or butane to the storage tank.

2. The system of claim 1, further comprising a potassium hydroxide treatment unit located between the three phase separator and the storage tank, wherein the potassium hydroxide treatment unit receives the liquid stream comprising liquid propane and/or butane from the three phase separator for removing hydrogen sulfide, carbonyl sulfide and/or mercaptans from the liquid stream comprising liquid propane and/or butane.

3. The system of claim 2, further comprising a coalescer located downstream of the potassium hydroxide treatment unit to remove treater waste carryovers.

4. The system of claim 1, further comprising a distillation column located between the three phase separator and the storage tank, wherein the distillation column removes water, light hydrocarbon gases and $C_{5+}$ hydrocarbons from the liquid stream comprising liquid propane and/or butane.

5. The system of claim 1, further comprising a dehydration unit located between the three phase separator and the storage tank, wherein the dehydration unit removes dissolved water from the liquid stream comprising liquid propane and/or butane.

* * * * *